(12) United States Patent
Albera et al.

(10) Patent No.: US 7,079,988 B2
(45) Date of Patent: Jul. 18, 2006

(54) METHOD FOR THE HIGHER-ORDER BLIND IDENTIFICATION OF MIXTURES OF SOURCES

(75) Inventors: Laurent Albera, Boulogne Billancourt (FR); Anne Ferreol, Colombes (FR); Pascal Chevalier, Courbevoie (FR); Pierre Comon, Peymeinade (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/813,673

(22) Filed: Mar. 31, 2004

(65) Prior Publication Data

US 2004/0260522 A1    Dec. 23, 2004

(30) Foreign Application Priority Data

Apr. 1, 2003    (FR)    .................... 03 04041

(51) Int. Cl.
   *H04B 15/00*    (2006.01)

(52) U.S. Cl. .............. 702/196; 702/189; 324/309; 375/340

(58) Field of Classification Search .............. 702/66, 702/79, 80, 111, 124, 126, 147, 149, 187, 702/189–191, 196; 324/309; 342/147; 455/63.1, 455/303, 304; 375/324, 325, 340
See application file for complete search history.

(56) References Cited

U.S. PATENT DOCUMENTS

| | | | | |
|---|---|---|---|---|
| 5,706,402 A | * | 1/1998 | Bell | 706/22 |
| 6,215,983 B1 | * | 4/2001 | Dogan et al. | 455/63.1 |
| 6,430,528 B1 | * | 8/2002 | Jourjine et al. | 704/200 |
| 6,463,099 B1 | * | 10/2002 | Cao et al. | 375/232 |
| 6,529,606 B1 | * | 3/2003 | Jackson et al. | 381/71.4 |
| 6,535,666 B1 | * | 3/2003 | Dogan et al. | 385/31 |
| 6,654,719 B1 | * | 11/2003 | Papadias | 704/233 |
| 6,697,633 B1 | * | 2/2004 | Dogan et al. | 455/509 |
| 6,711,528 B1 | * | 3/2004 | Dishman et al. | 702/189 |
| 6,744,407 B1 | * | 6/2004 | Ferreol | 342/441 |
| 2002/0051433 A1 | * | 5/2002 | Affes et al. | 370/335 |
| 2003/0204380 A1 | * | 10/2003 | Dishman et al. | 702/189 |
| 2005/0105644 A1 | * | 5/2005 | Baxter et al. | 375/316 |

FOREIGN PATENT DOCUMENTS

DE    10111626 A1 *    9/2002

OTHER PUBLICATIONS

P.Comon: "Tensor Decompositions State of the Art and Applications" Dec. 18-20, 2000, pp. 1-6, Warwick, UK.

(Continued)

*Primary Examiner*—Carol S. W. Tsai
(74) *Attorney, Agent, or Firm*—Lowe Hauptman & Berner LLP

(57) ABSTRACT

A method for the blind identification of sources within a system having P sources and N receivers comprises at least one step for the identification of the matrix of the direction vectors of the sources from the information proper to the direction vectors $a_p$ of the sources contained redundantly in the m=2q order circular statistics of the vector of the observations received by the N receivers. Application to a communications network.

19 Claims, 4 Drawing Sheets

OTHER PUBLICATIONS

P.Comon: "Independent Component Analysis, Contrasts, and Convolutive Mixtures" Dec. 16-18, 2002, pp. 1-8, Lancaster University, UK.

Comon P et al: "Blind separation of independent sources from convolutive mixtures" Mar. 2003, Eng, Japan, pp. 542-549.

P. Comon: "Block Methods for Channel Indentification and Source Separation" Oct. 2000, pp. 87-92, Lake Louise, Alberta, Canada.

Bourennane S et al: "Fast wideband source separation based on higher-order statistics" Banff, Alta, Canada Jul. 21-23, 1997, pp. 354-358.

Serviere C.: "Blind source separation of convolutive mixtures" Jun. 24-26, 1996, pp. 316-319.

Te-Won Lee et al: "Blind source separation of more sources than mixtures using overcomplete representations" Apr. 1999, pp. 87-90.

* cited by examiner

METHOD FOR THE HIGHER-ORDER BLIND IDENTIFICATION OF MIXTURES OF SOURCES

BACKGROUND OF THE INVENTION

1. Field of the Invention

The invention relates especially to a method of fourth-order and higher order self-learned (or blind) separation of sources from reception with N receivers or sensors (N≧2), this method exploiting no a priori information on sources or wavefronts, and the sources being P cyclostationary (deterministic or stochastic, analog or digital sources with linear or non-linear modulation) and statistically independent sources, It can be applied for example in the field of radio communications, space telecommunications or passive listening to these links in frequencies ranging for example from VLF to EHF.

It can also be applied in fields such as astronomy, biomedicine, radar, speech processing, etc.

2. Description of the Prior Art

The blind separation of sources and, more particularly, independent component analysis (ICA) is currently arousing much interest. Indeed, it can be used in many applications such as telecommunications, speech processing or again biomedicine.

For example, in antenna processing, if signals sent from a certain number of sources are received at an array of receivers and if, for each source, the timing spread of the channels associated with a different receivers is negligible as compared with the timing symbol time, then an instantaneous mixture of the signals sent from the sources is observed on said receivers.

The blind separation of sources is aimed especially at restoring the sources assumed to be statistically independent, and this is done solely on the basis of the observations received by the receivers.

Depending on the application, it is possible to retrieve only the instantaneous mixture, namely the direction vectors of the sources. This is the case for example with goniometry where said mixture carries all the information needed for the angular localization of the sources by itself: the term used then is "blind identification of mixtures".

For other applications such as transmission, it is necessary to retrieve the signals sent from the sources: the expression used then is separation or again blind or self-learned extraction of sources.

Certain prior art techniques seek to carry out a second-order decorrelation (as can be seen in factor analysis with principal component analysis (PCA).

ICA, for its part, seeks to reduce the statistical dependence of the signals also at the higher orders. Consequently, ICA enables the blind identification of the instantaneous mixture and thereby the extraction of the signals sent from the sources, not more than one of which is assumed to be Gaussian. At present, this is possible only in complying with certain assumptions: the noisy mixture of the sources must be linear and furthermore over-determined (the number of sources P must be smaller than or equal to the number of receivers N).

While Comon was the first to introduce the ICA concept and propose a solution, COM2 in the reference [1] (the different references are brought together at the end of the description) maximized a contrast based on fourth-order cumulants, Cardoso and Souloumiac [2], for their part developed a matrix approach, better known as JADE, and thus created the joint diagonalization algorithm.

Some years later, Hyvarinen et al. presented the FastICA method, initially for real signals [3], and then in complex cases [4]. This method introduces a contrast-optimizing algorithm called the fixed-point algorithm.

Comon has proposed a simple solution, COM1 [5], to contrast optimization presented in [6].

Although these methods perform very well under the assumptions stated here above, they may nevertheless be greatly disturbed by the presence of unknown noise, whether Gaussian or not, that is spatially correlated and inherent in certain applications such as HF radio communications.

Furthermore, as stated further above, the above methods are designed only to process over-determined mixtures of sources. Now in practice, for example in radio communications, it is not rare to have reception from more sources than receivers, especially if the reception bandwidth is great. We then have what are called under-determined mixtures (P>N).

Several algorithms have been developed already in order to process mixtures of this type. Some of them tackle the difficult problem of the extraction of sources [7–8] when the mixture is no longer linearly inverted, while others deal with the indication of the mixture matrix [7] [9–12].

The methods proposed in [9–11] exploit only fourth-order statistics while the method presented in [12] relies on the use of the characteristic second function of the observations, in other words on the use of non-zero cumulants of any order. As for the method used in [7], it relies on the conditional maximization of probability, in this case that of data conditional on the mixture matrix.

While these methods perform well, they have drawbacks in the operational context.

Thus, the method [9] is difficult to implement and does not ensure the identification of the direction vectors of sources of the same kurtosis. The methods [10] and [11] for their part cannot be used to identify the direction vectors of circular sources. The method [10], called S3C2, for its part confines the user in a configuration of three sources and two receivers, ruling out any other scenario. The method [7] authorizes the identification of four speech signals with only two receivers. However the samples observed must be temporally independent and each source must have a sparse density of probability. Finally, the method [12] is applicable only in the case of real sources, which is highly restrictive especially in digital communications. Furthermore, the algorithm depends greatly on the number of sources, and there is nothing today to prove that a poor estimation of this parameter will not impair the performance of the method.

SUMMARY OF THE INVENTION

The present invention offers a novel approach relying especially on the exploitation of the totality or practically the totality of the information proper to the direction vectors $a_p$ of the sources, contained redundantly in the matrix representing m=2q order circular statistics of the vector of the complex envelopes of the signals at output of the receivers.

The invention relates to a method for the blind identification of sources within a system comprising P sources and N receivers. It comprises at least one step for the identification of the matrix of the direction vectors of the sources from the information proper to the direction vectors $a_p$ of the sources contained redundantly in the m=2q order circular statistics of the vector of the observations received by the N receivers.

The m=2q order circular statistics are expressed for example according to a full-rank diagonal matrix of the autocumulants of the sources and a matrix representing the juxtaposition of the direction vectors of the sources as follows:

$$C_{m,x} = A_q \zeta_{m,s} A_q^H \quad (11)$$

where $$\zeta_{m,s} = \text{diag}([C_{1,1,\ldots,1,s}^{1,1,\ldots,1}, \ldots, C_{P,P,\ldots,P,s}^{P,P,\ldots,P}])$$

is the full-rank diagonal matrix of the m=2q order autocumulants $$C_{p,p,\ldots,p,s}^{p,p,\ldots,p}$$

des sources, sized (P×P), and where $A_q = [a_1^{\otimes(q-1)} \otimes a_1^* \ldots a_p^{\otimes(q-1)} \otimes a_p^*]$, sized ($N^q \times P$) and assumed to be of full rank, represents the juxtaposition of the P column vectors $[a_p^{\otimes(q-1)} \otimes a_p^*]$.

The method of the invention is used in a communications network and/or for goniometry using identified direction vectors.

The invention has especially the following advantages:

It enables the blind identification of instantaneous mixtures, both over-determined (where the number of sources is smaller than or equal to the number of receivers) and under-determined (where the number of sources is greater the number of receivers) as well as the blind extraction of the sources in the over-determined case;

At the m=2q order, which is an even-parity value where $q \geq 2$, the procedure called BIOME (Blind Identification of Over and underdetermined Mixtures of sources) can process up to $P = N^{(q-1)}$ sources using the array with N different receivers, once the m order autocumulants of the sources have the same sign;

An application of the fourth order method known as ICAR (Independent Component Analysis using Redundancies in the quadricovariance), enables the blind identification of over-determined (P≤N) instantaneous mixtures of sources and their blind extraction, in a manner that proves to be robust in the presence of a spatially correlated unknown Gaussian noise, once the sources have same-sign kurtosis (fourth-order standardized autocumulants);

an application of the BIOME method at the sixth-order level, called BIRTH (Blind Identification of mixtures of sources using Redundancies in the daTa Hexacovariance matrix), enables the blind identification of instantaneous mixtures, both over-determined (P≤N) and under-determined (P>N), of sources, as well as the blind extraction of the sources in the over-determined case. The BIRTH method has the capacity to process up to $N^2$ sources from an array with N different receivers, once the sixth-order autocumulants of the sources have a same sign.

BRIEF DESCRIPTION OF THE DRAWINGS

Other characteristics of advantages of the method according to the invention shall appear more clearly from the following description from a non-restrictive example of an embodiment and the appended figures, of which.

Figure 1:
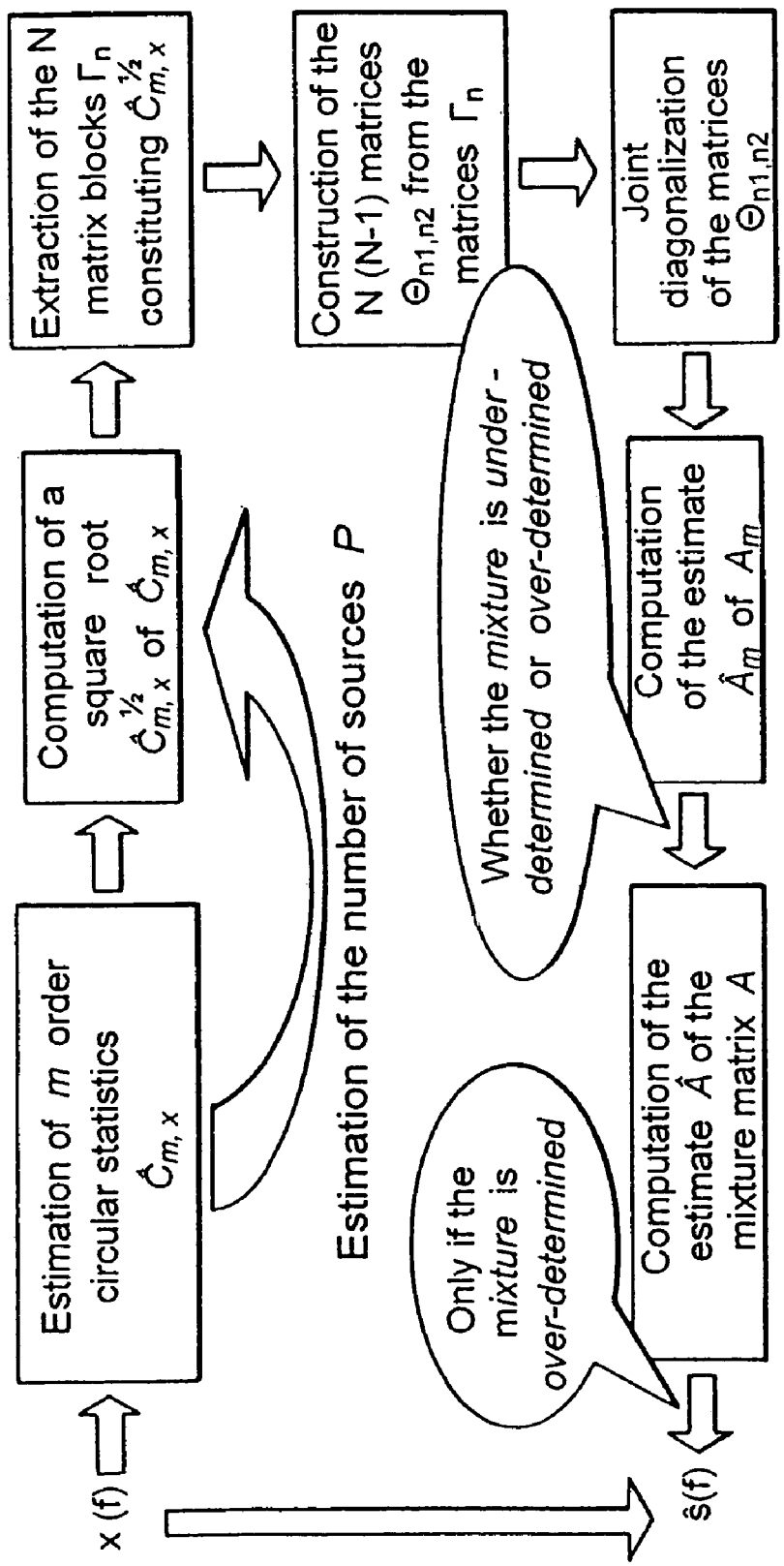
FIG. 1 is a drawing exemplifying an m-order implementation of the method.

The following examples are given for the identification and/or extraction of sources in an array comprising an array antenna comprising N receivers. It is assumed that this antenna receives a noisy mixture of signals from P statistically independent sources for example in narrow band (NB).

On the basis of these assumptions, the vector x(t) of the complex envelopes of the signals at output of the receivers is written, at the instant t $$x(t) = \sum_{p=1}^{P} s_p(t) a_p + v(t) = A s(t) + v(t) \quad (1)$$

where v(t) is the noise vector, assumed to be centered, Gaussian, spatially white and unknown, $s_p(t)$ and $a_p$ correspond respectively to the complex, narrow-band, cyclostationary and cycloergodic envelope BE (with a possible residue of a carrier as the case may be) and to the direction vector of the source p, s(t) is the vector whose components are the signals $s_p(t)$ and A is the matrix (N×P) whose columns are the vectors $a_p$.

Furthermore, the method generally described here below for the m=2q (q≥2) order uses the following assumptions, numbered $H_{1-4}$:

H1: At any instant t, the sources with complex values $s_p(t)$ are cyclostationary, cycloergodic and mutually decorrelated at the m order;

H2: At any instant t, the components $v_n(t)$ of the noise are stationary, ergodic, Gaussian and circular;

H3: A any instant t, s(t) and v(t) are statistically independent;

H4: the m order autocumulants of the sources are not zero and have the same sign.

With the above assumptions, for a given even-parity order m=2q, the problem of the blind identification of instantaneous mixtures of sources consists in finding the matrix A through the exploitation of certain m order statistics of the observations. This matrix A is found to the nearest trivial matrix (a trivial matrix has the form $\Lambda \Pi$ where $\Lambda$ is an invertible matrix and $\Pi$ is a permutation matrix).

The blind separation (extraction) of sources consists especially in determining the separator that is linear and invariant in time (LIT), W, with a dimension (N×P), the output vector of which has a dimension (P×1), $$y(t) = W^H x(t) \quad (2)$$

corresponds, plus or minus a trivial matrix, to the best estimate, ŝ(t), of the vector s(t), where the symbol $^H$ signifies a conjugate transpose.

The separator W is defined to the nearest trivial matrix inasmuch as neither the value of the output power values nor the order in which they are stored changes the quality of restitution of the sources.

Before any explanation of the steps of the method according to the invention, a few reminders are given on the statistics of the observations.

Statistics of the Observations

The method according to the invention uses especially 2, 4, 6, ..., m even-parity circular statistics of the observations.

According to the prior art described in the reference [15], the expression of the m order cumulants as a function of the moments of an order lower than m can be simplified.

Let $$G_{d,\ldots,e,x}^{f,\ldots,g}$$

be a scalar quantity with a complex value depending in the q lower indices $d, \ldots, e$ and the q higher indices $f, \ldots, g$ having values in $\{1, 2, \ldots, N\}$. The quantity $$G_{d,\ldots,e,x}^{f,\ldots,g}$$

then verifies the following three symmetries:
any permutation between the lower indices of $$G_{d,\ldots,e,x}^{f,\ldots,g}$$

does not modify the value of $$G_{d,\ldots,e,x}^{f,\ldots,g}:$$

for example, for q=2, $$G_{e,d,x}^{f,g} = G_{d,e,x}^{f,g},$$

any permutation between the higher indices of $$G_{d,\ldots,e,x}^{f,\ldots,g}$$

does not modify the value of $$G_{d,\ldots,e,x}^{f,\ldots,g}:$$

for example, for q=2, $$G_{d,e,x}^{g,f} = G_{d,e,x}^{f,g},$$

permutating all the higher indices with all the lower indices of $$G_{d,\ldots,e,x}^{f,\ldots,g}$$

has the effect of conjugating the value of $$G_{d,\ldots,e,x}^{f,\ldots,g}: G_{f,\ldots,g,x}^{d,\ldots,e} = (G_{d,\ldots,e,x}^{f,\ldots,g})^*.$$

Furthermore, the following notation is adopted: the quantity $$[r]\, G_{d,\ldots,e,x}^{f,\ldots,g}\, G_{h,\ldots,i,x}^{j,\ldots,k} \ldots G_{l,\ldots,m,x}^{n,\ldots,o}$$

designates the linear combination of the r possible and distinct products (modulo the three symmetries described here above) of the type $$G_{d,\ldots,e,x}^{f,\ldots,g}\, G_{h,\ldots,i,x}^{j,\ldots,k} \ldots G_{l,\ldots,m,x}^{n,\ldots,o},$$

weighted by the value 1. Each of the r products is built from the product $$G_{d,\ldots,e,x}^{f,\ldots,g}\, G_{h,\ldots,i,x}^{j,\ldots,k} \ldots G_{l,\ldots,m,x}^{n,\ldots,o}$$

in using and combining the following two rules of permutation:
lower index of one of the terms of the product $$G_{d,\ldots,e,x}^{f,\ldots,g}\, G_{h,\ldots,i,x}^{j,\ldots,k} \ldots G_{l,\ldots,m,x}^{n,\ldots,o}$$

permutates with a lower index of another term of the same product $$G_{d,\ldots,e,x}^{f,\ldots,g}\, G_{h,\ldots,i,x}^{j,\ldots,k} \ldots G_{l,\ldots,m,x}^{n,\ldots,o}$$

to give another (distinct) product: for example, for $(q_1, q_2)=(2, 2)$, $$G_{d,e,x}^{f,g}\, G_{h,i,x}^{j,k}$$

gives as other distinct products (modulo the three symmetries described here above)

$$G_{h,e,x}^{f,g}\, G_{d,i,x}^{j,k},\ G_{d,i,x}^{f,g}\, G_{h,e,x}^{j,k}\ \text{and}\ G_{h,i,x}^{f,g}\, G_{d,e,x}^{j,k},$$

a higher index of one of the terms of the product $$G_{d,\ldots,e,x}^{f,\ldots,g} G_{h,\ldots,i,x}^{j,\ldots,k} \ldots G_{l,\ldots,m,x}^{n,\ldots,o} \quad (5)$$

permutates with a higher index of another term of the same product $$G_{d,\ldots,e,x}^{f,\ldots,g} G_{h,\ldots,i,x}^{j,\ldots,k} \ldots G_{l,\ldots,m,x}^{n,\ldots,o}$$

to give another (distinct) product: for example, for $(q_1, q_2)=(2, 2)$, $$G_{d,e,x}^{f,g} G_{h,i,x}^{j,k}$$

gives the following as other distinct products (modulo the three symmetries described here above)

$$G_{d,e,x}^{j,g} G_{h,i,x}^{f,k},\ G_{d,e,x}^{f,k} G_{h,i,x}^{j,g}\ \text{and}\ G_{d,e,x}^{j,k} G_{h,i,x}^{f,g},$$

in order to obtain the totality of the r possible and distinct products (modulo the three symmetries described here above).

The following example, where $(q_1, q_2)=(2, 1)$ et $r=9$, illustrates this notation:

$$[9]\ G_{d,e,x}^{g,h} G_{f,x}^{i} = G_{d,e,x}^{g,h} G_{f,x}^{i} + G_{d,f,x}^{g,h} G_{e,x}^{i} + G_{f,e,x}^{g,h} G_{d,x}^{i} + \quad (3)$$
$$G_{d,e,x}^{g,i} G_{f,x}^{h} + G_{d,e,x}^{i,h} G_{f,x}^{g} + G_{d,f,x}^{g,i} G_{e,x}^{h} +$$
$$G_{d,f,x}^{h,i} G_{e,x}^{g} + G_{f,e,x}^{g,i} G_{d,x}^{h} + G_{f,e,x}^{i,h} G_{d,x}^{g}$$

m Order Statistics

In the case of potentially non-centered, stationary or cyclostationary sources, the m order circular statistics of the vector x(t), given by (1), can be written:

$$C_{i_1,i_2,\ldots i_q,x}^{i_{q+1},i_{q+2},\ldots i_m}  = \left\langle C_{i_1,i_2,\ldots i_q,x}^{i_{q+1},i_{q+2},\ldots i_m}(t) \right\rangle_c \quad (4)$$

where the symbol $$\langle f(t) \rangle_c = \lim_{T \to \infty} (1/T) \int_{-T/2}^{T/2} f(t) dt$$

corresponds to the operation of time-domain averaging, in continuous time, of f(t) on an infinite horizon of observation.

$$C_{i_1,i_2,\ldots i_q,x}^{i_{q+1},i_{q+2},\ldots i_m}(t) = Cum(x_{i_1}(t), x_{i_2}(t), \ldots, \quad (5)$$

$$x_{i_q}(t), x_{i_{q+1}}(t)^*, x_{i_{q+2}}(t)^*, \ldots, x_{i_m}(t)^*)$$

where q terms are conjugate and q terms are non-conjugate.

The m order statistics described by the expression (5) are said to be circular because the m order cumulant $Cum\{x_d(t), x_e(t), \ldots, x_f(t), x_g(t)^*, x_h(t)^*, \ldots, x_i(t)^*\}$ is computed from as many conjugate terms $(x_g(t)^*, x_h(t)^*, \ldots, x_i(t)^*)$ as non-conjugate terms $(x_d(t), x_e(t), \ldots, x_f(t))$.

The m order circular cumulants may be expressed as a function of the lower-than-m order moments as follows.

Let $$M_{i_1,i_2,\ldots i_q,x}^{i_{q+1},i_{q+2},\ldots i_m}(t) \text{ and } C_{i_1,i_2,\ldots i_q,x}^{i_{q+1},i_{q+2},\ldots i_m}(t)$$

be the m order moments and circular cumulants associated with the observation vector x(t), defined by:

$$M_{i_1,i_2,\ldots i_q,x}^{i_{q+1},i_{q+2},\ldots i_m}(t) = E[x_{i_1}(t), x_{i_2}(t), \ldots,$$

$$x_{i_q}(t), x_{i_{q+1}}(t)^*, x_{i_{q+2}}(t)^*, \ldots, x_{i_m}(t)^*]$$

$$C_{i_1,i_2,\ldots i_q,x}^{i_{q+1},i_{q+2},\ldots i_m}(t) = \sum_{k=1}^{m} (-1)^{k-1}(k-1)! \sum_{g=1}^{G_k} \prod_{S_g^k \in Part_{g,x}^k} M[S_g^k](t)$$

$Part_{g,x}^k = \{S_{g,x}^k(1) \cup S_{g,x}^k(1) \cup \ldots \cup S_{g,x}^k(k)\}$ designates the "g"th partition, among "$G_k$" possible partitions, of <<k>> subsets $$S_{g,x}^k = {}_{i_r,i_s,\ldots,i_t,x}^{i_u,i_v,\ldots,i_w},$$

where $1 \leq r \neq s \neq \ldots \neq t \leq q$ et $q+1 \leq u \neq v \neq \ldots \neq w \leq m$, such that $$Part_{g,x}^k = {}_{i_1,i_2,\ldots i_q,x}^{i_{q+1},i_{q+2},\ldots i_m}.$$

As for the union operator, written as $\cup$, it verifies $${}_{i_j,i_h,\ldots,i_o,x}^{i_p,i_r,\ldots,i_s} \cup {}_{i_t,i_u,\ldots,i_v,x}^{i_w,i_y,\ldots,i_z} = {}_{i_j,i_h,\ldots,i_o,i_t,i_u,\ldots,i_v,x}^{i_p,i_r,\ldots,i_s,i_w,i_y,\ldots,i_z}.$$

In practical terms, two great classes of estimators may be used to estimate the above statistics: in the case of stationary sources, it is possible to use a non-skewed and consistent empirical estimator for potentially centered, ergodic, stationary sources whereas, in the case of potentially non-centered cyclostationary sources, it is necessary to use what is called an exhaustive, non-skewed and consistent estimator for potentially non-centered, cycloergodic and cyclostationary sources. This exhaustive estimator is, for example, determined according to an approach described in the references [13–14].

Arrangement and Storage of m Order Statistics

As shown here above, the statistics $$C_{d,e,\ldots,f,x}^{g,h,\ldots,k},$$

for $1 \leq d, e, \ldots, f, g, h, \ldots k \leq N$ are functions with $m=2q$ inputs (m being an even-parity value), it is then possible to arrange them in a matrix ($N^q \times N^q$) that will be named $C_{m,x}$.

Explicitly, the quantity $$C_{d,e,\ldots,f,x}^{g,h,\ldots,k}$$

is located at the ith row and at the jth column of the matrix $C_{m,x}$ in writing $i=N[\ldots N[N(d-1)+e-1]+\ldots]+k$ t $j=N[\ldots N[N(g-1)+h-1]+\ldots]+f$.

Arrangement and Fourth-order Statistics

In the case of centered stationary sources, the fourth-order circular statistics of the vector $x(t)$, given by (1), are written as follows:

$$C_{d,e,x}^{f,g} = Cum\{x_d(t), x_e(t), x_f(t)^*, x_g(t)^*\} \quad (4)$$

$$= M_{d,e,x}^{f,g} - M_{d,e,x} M_x^{f,g} - [2] M_{d,x}^{f} M_{e,x}^{g},$$

In practical terms, these statistics may be estimated by using a non-skewed and consistent empirical estimator for centered, ergodic, stationary sources.

In the case of potentially non-centered cyclostationary sources, the fourth-order circular statistics of the vector $x(t)$ to be taken into account are written as follows:

$$C_{d,e,x}^{f,g} = \langle Cum\{x_d(t), x_e(t), x_f(t)^*, x_g(t)^*\} \rangle_C \quad (5)$$

$$= \langle M_{d,e,x}^{f,g}(t) \rangle_C - \langle [4] M_{d,x}(t) M_{e,x}^{f,g}(t) \rangle_C - $$

$$\langle M_{d,e,x}(t) M_x^{f,g}(t) \rangle_C - \langle [2] M_{d,x}^{f}(t) M_{e,x}^{g}(t) \rangle_C +$$

$$2\langle M_{d,x}(t) M_{e,x}(t) M_x^{f,g}(t) \rangle_C +$$

$$2\langle M_x^{f}(t) M_x^{g}(t) M_{d,e,x}(t) \rangle_C +$$

$$2\langle [4] M_{d,x}(t) M_x^{f}(t) M_{e,x}^{g}(t) \rangle_C - $$

$$6\langle M_{d,x}(t) M_{e,x}(t) M_x^{f}(t) M_x^{g}(t) \rangle_C,$$

In practical terms, these fourth-order statistics may be estimated by using the estimator known as the exhaustive, non-skewed and consistent estimator for cyclostationary, cycloergodic and potentially non-centered sources. This exhaustive estimator is described in [13–14].

As shown here above, the statistics $$C_{d,e,x}^{f,g},$$

for $1 \leq d, e, f, g \leq N$ are four-input functions. It is possible then to arrange them in a matrix ($N^2 \times N^2$) that will be called a quadricovariance matrix $Q_x$ given for example in the reference [13–14].

Arrangement and Sixth-order Statistics

In the case of centered stationary sources, the sixth-order circular statistics of the vector $x(t)$, given by (1), are written as follows:

$$C_{d,e,f,x}^{g,h,i} = Cum\{x_d(t), x_e(t), x_f(t), x_g(t)^*, x_h(t)^*, x_i(t)^*\} \quad (6)$$

$$= M_{d,e,f,x}^{g,h,i} - [3] M_{d,e,f,x}^{g} M_x^{h,i} - [9] M_{d,e,x}^{g,h} M_{f,x}^{i} -$$

$$[3] M_{d,e,x} M_{f,x}^{g,h,i} + 2[9] M_{d,e,x} M_{f,x}^{g} M_x^{h,i} +$$

$$2[6] M_{d,x}^{g} M_{e,x}^{h} M_{f,x}^{i}$$

In practical terms, these statistics may be estimated by using a non-skewed and consistent empirical estimator for centered, ergodic, stationary sources.

In the case of centered cyclostationary sources, the sixth-order circular statistics of the vector $x(t)$ given by (1), are written as follows:

$$C_{d,e,f,x}^{g,h,i} = \langle Cum\{x_d(t), x_e(t), x_f(t), x_g(t)^*, x_h(t)^*, x_i(t)^*\} \rangle_C \quad (7)$$

$$= \langle M_{d,e,f,x}^{g,h,i}(t) \rangle_C - \langle [3] M_{d,e,f,x}^{g}(t) M_x^{h,i}(t) \rangle_C -$$

$$\langle [9] M_{d,e,x}^{g,h}(t) M_{f,x}^{i}(t) \rangle_C - \langle [3] M_{d,e,x}(t) M_{f,x}^{g,h,i}(t) \rangle_C +$$

$$2\langle [9] M_{d,e,x}(t) M_{f,x}^{g}(t) M_x^{h,i}(t) \rangle_C +$$

$$2\langle [6] M_{d,x}^{g}(t) M_{e,x}^{h}(t) M_{f,x}^{i}(t) \rangle_C$$

In practical terms, these sixth-order statistics may be estimated by using an estimator called an exhaustive, non-skewed and consistent estimator for cyclostationary, cyclo-ergodic and centered sources.

As shown here above, the statistics $$C_{d,e,f,x}^{g,h,k}$$

for $1 \leq d, e, f, g, h, k \leq N$ are six-input functions. It is possible then to arrange them in a ($N^3 \times N^3$) matrix that will be called a hexacovariance matrix $H_x$.

Principle Implemented in the Method According to the Invention

The method according to the invention uses especially a property of multilinearity of the cumulants and the Gaussian nature of noise which take the form of the following matrix expression $$C_{m,x} = [A^{\otimes(q-1)} \otimes A^*] C_{m,s} [A^{\otimes(q-1)} \otimes A^*]^H \quad (10)$$

where $C_{m,x}$ and $C_{m,s}$ are the matrices of the m order statistics defined earlier, having respective sizes ($N^q \times N^q$) and ($P^q \times P^q$), and being associated with the vectors $x(t)$ and $s(t)$ where $A^{\otimes(q-1)}$ corresponds to an adopted notation defined thus: the matrix $B^{\otimes k}$ designates the matrix B raised to the power (in the sense of the Kronecker product) k, i.e. in taking the Kronecker product $$B^{\otimes k} = \underbrace{B \otimes B \otimes \ldots \otimes B}_{k \text{ times}},$$

in writing $B^{\otimes 0} = 1$.

The Kronecker product may be recalled here: let A and B be two matrices respectively sized ($L_A \times C_A$) and ($L_B \times C_B$). The Kronecker product $D = A \otimes B$ is a matrix sized ($L_A L_B \times C_A C_B$) defined by $D = (A_{ij} B) 1 \leq i \leq LA$, $1 \leq j \leq CA$.

Without departing from the framework of the invention, other modes of expression associated with other modes of arrangement of the cumulants may be used:

$$C_{m,x} = [A^{\odot q}] C_{m,s,\,l} [A^{\odot q}]^H \tag{10a}$$

where 1 is chosen arbitrarily between 1 and q and where $C_{m,s,\,l}$ is the matrix of the m=2q order statistics of s(t) associated with the index 1 chosen. Each expression conditions the number of sources potentially identifiable from a given array.

Here below in the description, the analysis is given in using the expression of the relationship (10).

Inasmuch as the sources are independent, the matrix of the m order statistics associated with the sources, $C_{m,s}$, is a diagonal matrix. However, it turns out to be not a full-rank matrix. The method according to the invention considers a matrix determined from a full-rank diagonal matrix of the autocumulants and from the matrix representing the juxtaposition of the P column vectors relative to the direction vectors of the sources:

$$C_{m,x} = A_q \zeta_{m,s} A_q^H \tag{11}$$

where $$\zeta_{m,s} = diag([C_{1,1,\ldots,1,s}^{1,1,\ldots,1}, \ldots, C_{P,P,\ldots,P,s}^{P,P,\ldots,P}])$$

is the full-rank diagonal matrix of the m=2q order autocumulants $$C_{p,p,\ldots,p,s}^{p,p,\ldots,p}$$

from the P sources, sized (P×P), and where $A_q = [a_1^{\otimes(q-1)} \otimes a_1^* \ldots a_p^{\otimes(q-1)} \otimes a_p^*]$ sized ($N^q \times P$) and assumed to be of full rank, represents the juxtaposition of the P column vectors $[a_p^{\otimes(q-1)} \otimes a_p^*]$. Furthermore, we assume that the matrix $A_{q-1} = [a_1^{\otimes(q-2)} \otimes a_1^* \ldots a_p^{\otimes(q-2)} \otimes a_p^*]$, sized ($N^{(q-1)} \times P$), is also a full-rank matrix.

The method according to the invention enables the advantageous exploitation and extraction, for example, of the totality of the information proper to the direction vectors $a_p$ of the sources, redundantly contained in the matrix of the m=2q order circular statistics of the observations vector x(t), $C_{m,x}$ and more particularly in the matrix $A_q$.

The method comprises, for example, the steps described here below. The samples of the vector x(t) are assumed to have been observed and the matrix $C_{m,x}$ is assumed to have been estimated from these samples.

Step 1: Singular Value Decomposition of the Matrix $C_{m,x}$

This step computes the square root $C_{m,x}^{1/2}$ of the full-rank matrix $C_{m,x}$ for example through the eigenvalue decomposition of the Hermitian matrix $C_{m,x} = E_s L_s E_s^H$ where $L_s$ and $E_s$ are respectively the diagonal matrix (in terms of absolute value) real eigenvalues of $C_{m,x}$ and the matrix of the associated orthonormal eigenvectors. This step shows the relationship existing between $C_{m,x}^{1/2}$ and $A_q$:

$$C_{m,x}^{1/2} = E_s |L_s|^{1/2} \tag{12}$$
$$= A_q \zeta_{m,s}^{1/2} V^H$$
$$= [a_1^{\otimes(q-1)} \otimes a_1^* \ldots a_p^{\otimes(q-1)} \otimes a_p^*] \zeta_{m,s}^{1/2} V^H$$

where V is a unit matrix, sized (P×P), unique for $L_s$ and $E_s$ as given matrices, and where $|L_s|^{1/2}$, $\zeta_{sn}^{1/2}$ are square roots respectively of $|L_s|$ and $\zeta_{m,s}$ (|.| designates the absolute value operator).

$L_s$ and $E_s$ are, for example, respectively the diagonal matrix of the P greatest (in terms of absolute value) real eigenvalues of $C_{m,x}$ and the matrix of the associated orthonormal eigenvectors.

For a full-rank matrix $A_q$, it is possible to ascertain that the hypothesis (H4) is equivalent to assuming that the diagonal elements of $L_s$ are non-zero and have the same sign.

Step 2

This step consists of the extraction, from the matrix $$C_{m,x}^{1/2} = [\Gamma_1^T, \ldots, \Gamma_N^T]^T,$$

of the N matrix blocks $\Gamma_n$: each block $\Gamma_n$ sized ($N^{(q-1)} \times P$) is constituted by the $N^{(q-1)}$ successive rows of $$C_{m,x}^{1/2}$$

starting from the "$N^{(q-1)}$ (n−1)+1"th row.

Step 3

This step entails the building of the N(N−1) matrices $\Theta_{n_1,n_2}$ defined, for all $1 \leq n_1 \neq n_2 \leq N$, by $\Theta_{n1,n2} = \Gamma_{n1}^\# \Gamma_{n2}$ where # designates the pseudo-inversion operator.

In noting for all $1 \leq n \leq N$, $\Phi_n = diag([A_{n1}, A_{n2}, \ldots, A_{nP}])$ where $A_{ij}$ is the component of A located on the ith row and jth column, there is equality $\Gamma_n =$ $$A_{(q-1)} \Phi_n \zeta_{m,s}^{1/2} V^H$$

for all $1 \leq n \leq N$, and the fact that the matrix V jointly diagonalizes the N(N−1) matrices $$\Theta_{n1,n2} = \Gamma_{n1}^\# \Gamma_{n2}$$
$$= V \zeta_{m,s}^{-1/2} \Phi_{n1}^{-1} \Phi_{n2} \zeta_{m,s}^{1/2} V^H,$$

which, it may be recalled, is sized (P×P).

Step 4

This step consists in determining the matrix $V_{sol}$, resolving the problem of the joint diagonalization of the N(N−1) matrices $\Theta_{n1,n2}$ for example in using a method of diagonalization described in the reference [2]. The matrix $$C_{m,x}^{1/2} V_{sol},$$

where $V_{sol}$=V T is a unitary matrix jointly diagonalizing the matrices $\Theta_{n1,n2}$ to the nearest unitary trivial matrix T, is an estimate of the matrix $A_q$ to the nearest trivial matrix.

Different methods, known to those skilled in the art, enable the extraction from $A_q$ of an estimate A;^ of the mixture matrix A.

Step 5

Step 5A

One procedure consists, for example, in taking the average of the $K=N^{(q-1)}$ blocks $(\Sigma_k)^*$ sized (N×P) (for all $1 \leq k \leq N^{(q-1)}$ (the block $\Sigma_k$ is constituted by N successive rows of $A_q=[\Sigma_1^T, \ldots, \Sigma_k^T]^T$ starting from the "N (k−1)+1"th row), or else in starting only one, for example $(\Sigma_1)^*$. This approach enables the estimation, in any order and excepting an amplitude, of the P direction vectors $a_p$ and therefore the mixture A matrix to the nearest trivial matrix.

Step 5B

Another step consists, for example, for each of the P columns $b_p$ of $$A_q = \left[ a_1^{\otimes(q-1)} \otimes a_1^* \ldots a_p^{\otimes(q-1)} \otimes a_p^* \right]$$

in,
extracting the $K=N^{(q-2)}$ vectors $b_p(k)$ stacked one beneath the other such that:

$$b_p = \left[ a_p^{\otimes(q-1)} \otimes a_p^* \right] = \left[ b_p(1)^T, b_p(2)^T, \ldots, b_p(K)^T \right]^T \quad (14)$$

then
converting said column vectors $b_p(k)=(A_{ip} \ldots A_{jp})$ [$a_p \otimes a_p^*$] sized (N²×1) into a matrix $B_p(k)=(A_{ip} \ldots A_{jp})$ [$a_p a_p^H$] (where $1 \leq i, j \leq N$) sized (N×N) and
jointly decomposing these $K=N^{(q-2)}$ matrices into singular values (singular value decomposition or SVD): the eigenvector common to the K matrices $B_p(k)$ and associated with the eigenvalue that is the greatest (in terms of modulus) is therefore a column vector of the matrix A. It must be noted that the quantity $(A_{ip} \ldots A_{jp})$ is in the present case the product of (q−2) components of A.

This step of processing on the P columns $b_p$ of $A_q$, enables the estimation, in any order and plus or minus one phase, of the P direction vectors $a_p$ and therefore, to the nearest trivial matrix, the mixture matrix A.

Step 6

The mixture matrix A representing the direction vector of the sources contains, by itself, the information needed for the angular localization of the sources. In this context, from the estimation of the different columns of A, it is possible to implement an arbitrary method of goniometry exploiting this information. Such a method is presented for example in the document [18].

Step 7

To estimate the sources vector s(t) in an over-determined context (i.e. when P≦N), the method applies an LIT type filter to the observations x(t) explicitly using the estimation of the mixture matrix A. It is possible, for example, to choose the FAS filter described in the reference [17], which is optimal in the presence of decorrelated sources.

The method comprises, for example, a step 0 which consists of the building, from the different observation vectors, x(t), of an estimate $\hat{C}_{m,x}$ of the matrix of statistics $C_{m,x}$ of the observations, according to the method given earlier. In this case, the steps 1 to 6 of the method are implemented on the estimate $\hat{C}_{m,x}$ of the matrix.

Criterion of Performance

According to one alternative embodiment, the method comprises a step using a normal criterion of performance for the evaluation of the blind identification of mixtures. This criterion is not global and enables the evaluation of the quality of identification of each direction vector estimated: it is then possible to compare two distinct methods of blind identification with respect to each direction vector, and hence to each source. This criterion is the extension, to the blind identification of mixtures, of the criterion based on SINR (signal-to-interference-plus-noise ratio) given in the reference [17] introduced for the blind extraction of sources. It is a P-uplet described by $$D(A, \hat{A}) = (\alpha_1, \alpha_2, \ldots \alpha_P) \quad (15)$$

where $$\alpha_p = \min_{1 \leq i \leq P} [d(a_p, \hat{a}_i)] \quad (16)$$

and where d(u,v) is the pseudo-distance between the vectors u and v, defined by $$d(u, v) = 1 - |<u, v>|^2 \|u\|^{-2} \|v\|^{-2} \quad (17)$$

It may be noted that < . , . > designates the scalar product defined for two vectors of a same dimension.

The method described for the m=2q order application can be applied especially to the fourth-order and sixth-order statistics, for example according to the examples given here below.

Application of the Method for the Blind Separation of Fourth-order Sources

An alternative embodiment of the method known as ICAR (Independent Component Analysis using Redundancies in the quadricovariance) exploits the m=4 (q=2) order statistics, corresponding to the matrix of circular quadricovariance of the Cm,x, written as $Q_{xj}$. This method enables the blind identification of the instantaneous mixture A or the blind extraction of the sources s(t) when N≧P, in other words only when the mixture is over-determined.

The model (1) is assumed to be verified along with the fourth-order hypotheses $H_{1-4}$.

The method called ICAR exploits especially the expression (11) which, when written for fourth-order statistics, is expressed as follows:

$$Q_x = A_2 \zeta_{4,s} A_2^H \quad (18)$$

where $$\zeta_{4,s} = \text{diag}([C_{1,1,s}^{1,1}, \ldots, C_{P,P,s}^{P,P}])$$

is the full-rank matrix of the fourth-order autocumulants $C_{p,p,s}^{p,p}$ of the sources, sized (P×P), and where $A_2 = [a_1 \otimes a_1^* \ldots a_p \otimes a_p^*]$ sized ($N^2 \times P$) and assumed to be full-rank, represents the juxtaposition of the P column vectors $[a_p \otimes a_p^*]$.

Furthermore, assuming that the mixture A matrix sized (N×P), is also a full-rank matrix.

The method performs, for example, the steps 0 to 5 described in the case of the m=2q order application, in using the following parameters: $C_{m,x} = Q_x$ and $\zeta_{m,s} = \zeta_{4,s}$ In this example of an implementation, the method may also include a step 0 which consists of: the building, from different observation vectors x(t), of an estimate Q of the matrix of quadricovariance $Q_x$ of the observations. The steps 1 to 6 are then carried out on this estimated value.

Examples of Results Obtained by Applying the Method to Fourth-order Statistics

Figure 2:
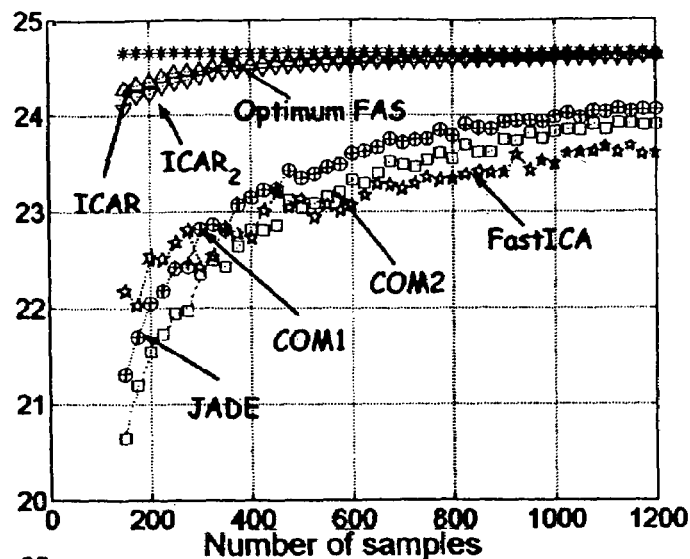
FIGS. 2, 3 and 4 show results of simulation of a fourth-order implementation of the method.
Figure 3:
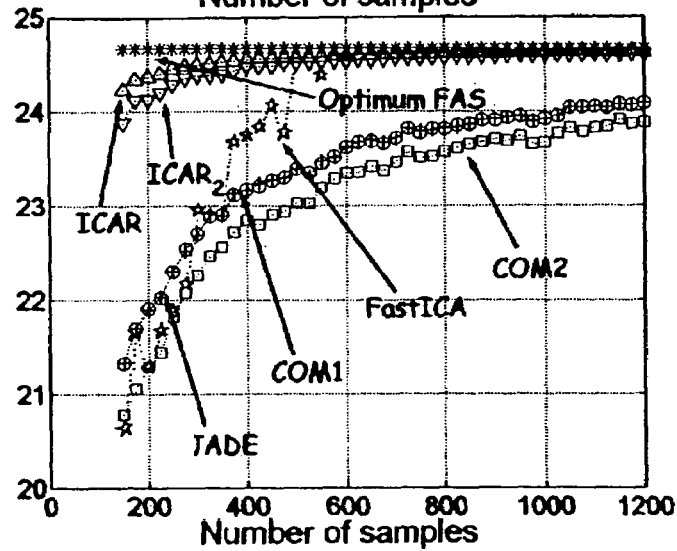
Figure 4:
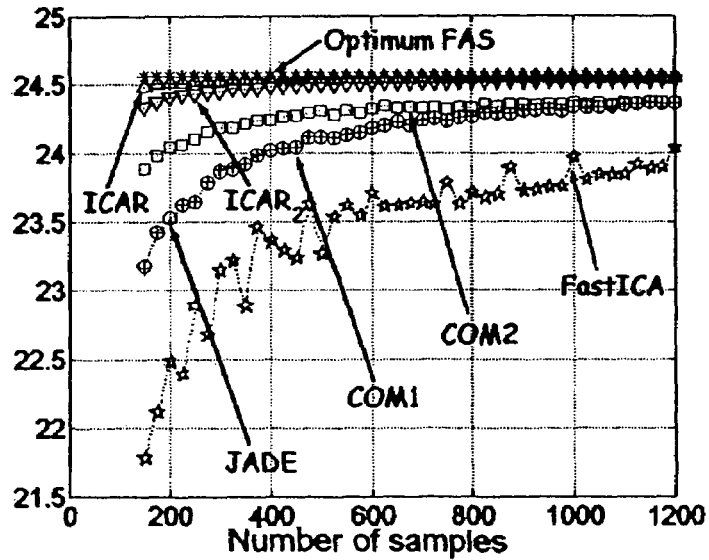

FIGS. 2, 3 and 4 show a graph in which the x-axis corresponds to the number of samples L and the y-axis to the performance, the results of the simulation presenting the performance of the method according to the invention in a fourth-order application presented here above of ICAR (in implementing the step 5B), ICAR$_2$ (in implementing the step 5A) and methods for the blind separation of sources (COM1, COM2, JADE, FastICA) known to those skilled in the art. The conditions of simulation are the following:

It is assumed that signals from P=3 non-filtered sources, namely one BPSK source and two QPSK sources, are received on a circular array of N=5 receivers such that R/λ=0.55 (with R and λ the radius of the array and the wavelength) and such that the signal-to-noise ratio, SNR, is equal to 20 dB for each source.

The noise is Gaussian and spatially non-correlated.

The three sources are baseband sources and their time symbol is chosen to be equal to the sampling time.

The criterion used to obtain the best appreciation of the results of extraction from the source p for a given method is the maximum signal-to-interference-plus-noise ratio associated with the source p, better known as SINRM$_p$ [17]. It may be compared with the optimum SINRM$_p$ computed by using not the estimated mixture matrix but, on the contrary, the exact mixture matrix as well as the exact statistics of the observations. It is this comparison that is presented in FIGS. 2–4.

More particularly, FIG. 2 represents the SINRM of the source 1 associated with ICAR, ICAR$_2$ along with the most efficient methods currently being used for the blind separation of sources such as JADE, COM1, COM2 and FastICA.

FIG. 3 shows the SINRM of the source 2 for the same methods (ICAR, ICAR$_2$, JADE, COM1, COM2, FastICA and FIG. 4 shows those of the source 3.

In each of the figures, it can be seen that the two methods ICAR and ICAR$_2$ perform very well and are slightly more efficient than the other methods JADE, COM1, COM2 and FastICA. As for the FastICA algorithm, its best performance relates to the source 2 for which it converges completely from 550 samples onwards.

As for the difference in results between ICAR and ICAR$_2$ in this configuration it proves to be negligible as compared with the difference in performance between the ICAR methods and the JADE, COM1, COM2 and FastICA methods which, however, are very good.

Application of the Method to Sixth-order Statistics

According to another alternative embodiment, the method uses sixth-order statistics. This variant known as BIRTH (Blind Identification of mixtures of sources using Redundancies in the daTa Hexacovariance matrix) enables the identification from an array of N receivers, of the direction vectors of at most P=$N^2$ sources (in the case of an array with different receivers). It also enables the extraction of at most P=N sources for which the direction vector's are explicitly identified.

The BIRTH method uses certain sixth-order statistics, stored in the hexacovariance matrix C6,x designated H$_x$. Thus, this alternative implementation fully exploits the information proper to the instantaneous mixture A of the sources, contained in H$_x$, especially through an artful writing of H$_x$ relative to the direction vectors of the sources, this being done by means of the property of multi-linearity of the cumulants:

$$H_x = A_3 \zeta_{6,s} A_3^H \quad (20)$$

where $$\zeta_{6,s} = \text{diag}([C_{1,1,1,s}^{1,1,1}, \ldots, C_{P,P,P,s}^{P,P,P}])$$

is the full-rank matrix of the sixth-order autocumulants $C_{p,p,p,s}^{p,p,p}$ of the sources, sized (P×P), and where $A_3 = [a_1^{\otimes 2} \otimes a_1^* \ldots a_p^{\otimes 2} \otimes a_p^*]$, sized ($N^3 \times P$) and assumed to be a full-rank matrix, represents the juxtaposition of the P column vectors $[a_p^{\otimes 2} \otimes a_p^*] = [a_p \otimes a_p \otimes a_p^*]$. Furthermore, we assume that the matrix $A_2 = [a_1 \otimes a_1^* \ldots a_p \otimes a_p^*]$, sized ($N^2 \times P$), is also a full-rank matrix.

The sixth-order method comprises the steps 1 to 6 and the step 0 described here above in using the following parameters: $C_{m,x} = H_x$ et m=3.

Simulations

FIGS. 5, 6, 7 and 8 show a graph in which the x-axis corresponds to the number of samples L and the y-axis corresponds to performance, namely the efficient operation of the method according to the invention in a sixth-order application. The following are the conditions for obtaining the curves:

Let it be assumed that P=3 statistically independent sources, more particularly two QPSK sources and one BPSK source, all three being unfiltered, are received on a linear array of N=2 receivers such that R/λ=0.55 (with R and λ respectively being the radius of the array and the wavelength).

The three sources, assumed to be synchronized, have the same signal-to-noise ratio, written as SNR and being equal to 20 dB for each source with a symbol time that is four times the sampling time.

The BPSK source is chosen in baseband while the two QPSK sources have carriers respectively equal to half and one-third of the sampling frequency.

The mixture matrix A is chosen so that the column vectors of the matrix A$_3$ are linearly independent. The noise for its part is Gaussian and spatially non-correlated.

The instantaneous mixture of noisy sources is considered to be an over-determined mixture because the number of sources is greater than the number of receivers. The algorithms JADE, COM1, COM2, S3C2 known to those skilled in the art and the method of the invention in a sixth-order application are implemented for the blind identification of the over-determined mixture A.

The performance criterion $\alpha_p$, defined by the equation (18), is computed on 200 operations, and this is done for each source p ($1 \leq p \leq 3$): it will thus enable the comparison of the five methods.

Figure 5:
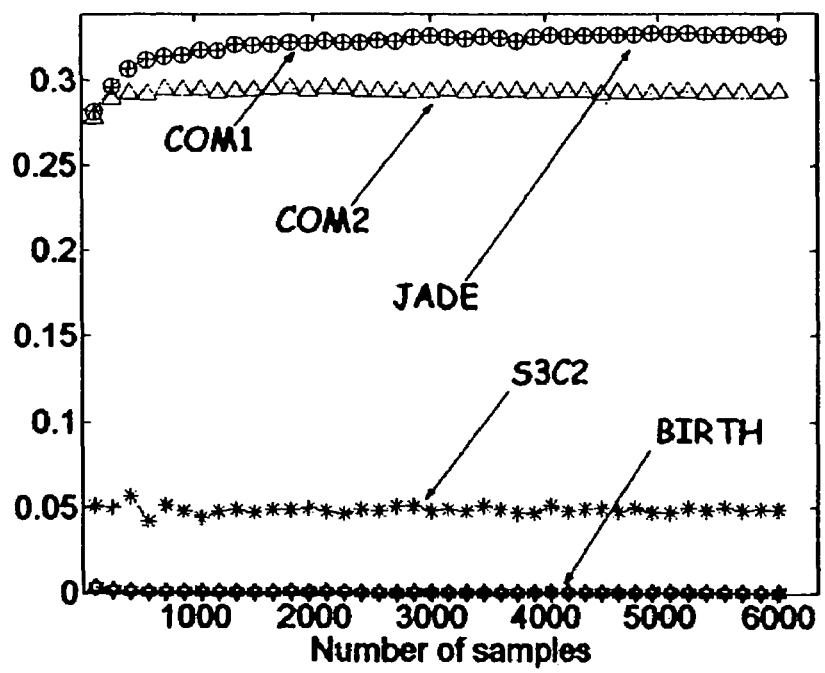
FIGS. 5, 6, 7 and 8 show results of simulation of a sixth-order implementation of the method.

According to the above assumptions, FIG. 5 shows the variations in the quantity $\alpha_3$ resulting from the algorithms JADE, COM1, COM2, S3C2 and the method according to the invention, BIRTH, depending on the number of samples. The method according to the invention, unlike the prior art methods, makes it possible to identify the directional vector in question.

Figure 6:
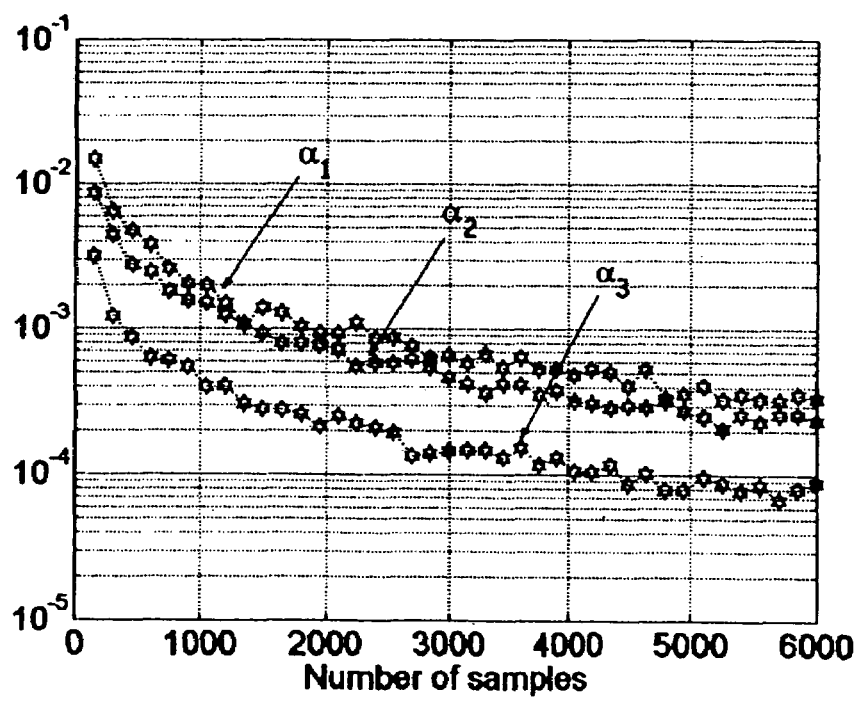
Figure 7:
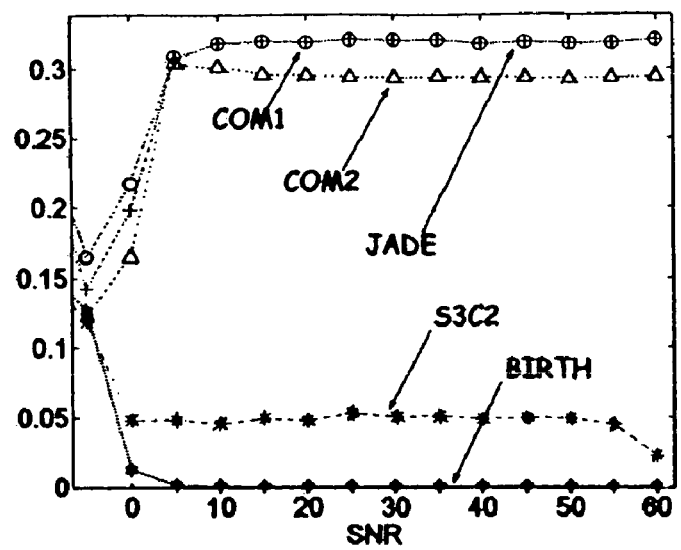

FIG. 6 gives a view, in the same context, of the variations of the triplet $D(A, A;^\wedge) = (\alpha_1, \alpha_2, \alpha_3)$, associated with the method according to the invention in a sixth-order application as a function of the number of samples. The three coefficients $\alpha_p$ rapidly decrease to zero as and when the number of samples increases.

FIG. 5 shows the variations in the quantity $\alpha_3$ resulting from the prior art methods JADE, COM1, COM2, S3C2 and the method according to the invention depending, this time, on the signal-to-noise ratio (SNR) of the source 3. The method BIRTH is fully successful in identifying the direction vector of the source 3 even for a low value of SNR.

Finally, let it be assumed that the above P=3 sources are received on a circular array of N=3 receivers such that $R/\lambda=0.55$.

Figure 8:
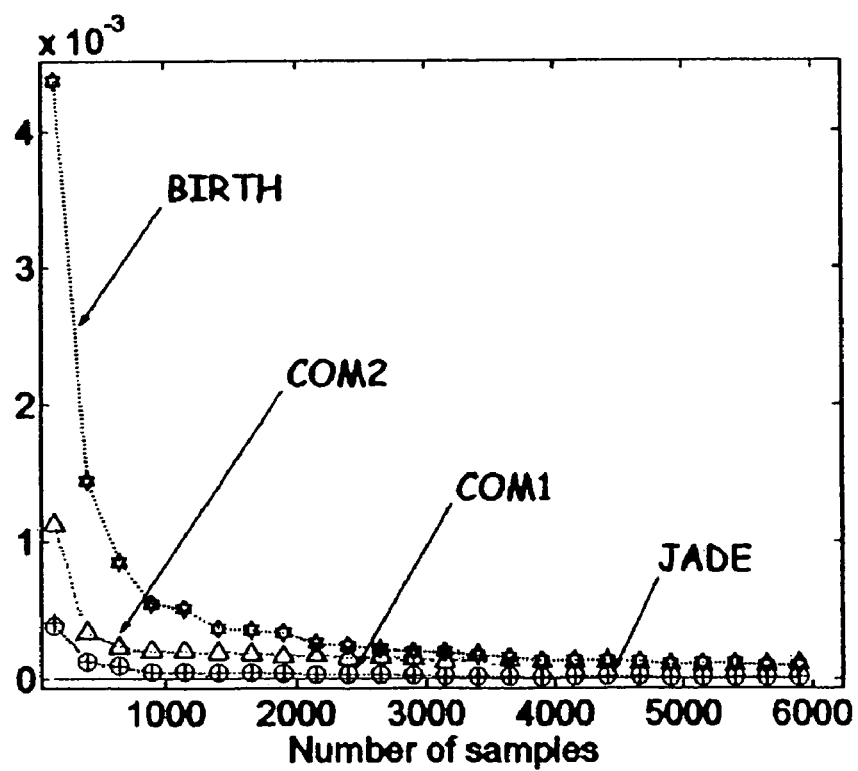

FIG. 8 then shows the variations of the quantity $\alpha_3$ resulting from the algorithms JADE, COM1, COM2 and BIRTH has a function of the number of samples: the BIRTH algorithm works in an over-determined context, namely in the context where the number of sources is smaller than the number of receivers, and although sixth order cumulants of the observations must be estimated, the speed of convergence of BIRTH is the same magnitude is that of the methods referred to further above.

BIBLIOGRAPHY

[1] P. COMON, "Independent Component Analysis, a new concept?" *Signal Processing, Elsevier*, vol. 36, No. 3, pp. 287–314, April 1994.

[2] J.-F. CARDOSO and A. SOULOUMIAC, "Blind beamforming for non-gaussian signals," *IEE Proceedings-F*, vol. 140, No. 6, pp. 362–370, December 1993.

[3] H. HYVARINEN and E. OJA, "A fast fixed-point algorithm for independent component analysis," *Neural Computation*, vol. 9, No. 7, pp. 1483–1492, 1997.

[4] E. BINGHAM and H. HYVARINEN "A fast fixed-point algorithm for independent component analysis of complex valued signals," *Int. J. of Neural Systems*, vol. 10, No. 1, pp. 1–8, 2000.

[5] P. COMON, "From source separation to blind equalization, contrast-based approaches," in *ICISP* 01, *Int. Conf. on Image and Signal Processing*, Agadir, Morocco, May 3–5 2001, pp. 20–32.

[6] N. THIRION and E. MOREAU, "New criteria for blind signal separation," in *IEEE Workshop on Statistical Signal and Array Processing*, Pennsylvania, US, August 2000, pp. 344–348.

[7] T. W. LEE, M. S. LEWICKI, M. GIROLAMI, and T. J. SEJNOWSKI, "Blind source separation of more sources than mixtures using overcomplete representations," IEEE Signal Processing Letters, vol. 6, No. 4, pp. 87–90, April 1999.

[8] P. COMON and O. GRELLIER, "Non-linear inversion of underdetermined mixtures," in ICA 99, IEEE Workshop on Indep. Comp. Anal. and Signal Separation, Aussois, France, Jan. 11–15 1999, pp. 461–465.

[9] J. F. CARDOSO, "Super-symetric decomposition of the fourth-order cumulant tensor. Blind identification of more sources than sensors," in ICASSP 91, Toronto, Canada, May 1991, pp. 3109–3112.

[10] P. COMON, "Blind channel identification and extraction of more sources than sensors," in SPIE Conference, San Diego, US, Jul. 19–24 1998, pp. 2–13.

[11] L. DeLATHAUWER, P. COMON, and B. DeMOOR, "Ica algorithms for 3 sources and 2 sensors," in Sixth Sig. Proc. Workshop on Higher Order Statistics, Caesarea, Israel, Jun. 14–16 1999, pp. 116–117.

[12] A. TALEB, "An algorithm for the blind identification of N independent signal with 2 sensors," in ISSPA 01, sixteenth symposium on signal processing and its applications, Kuala-Lumpur, Malaysia, Aug. 13–16 2001.

[13] A. FERREOL, P. CHEVALIER, and L. ALBERA, patent application entitled "Procede de traitement d'antennes sur des signaux cyclostationnaires potentiellement non centres," (Method of antenna processing on potentially non-centered cyclostationary signals) filed on behalf of THALES, National filing No. 02 05575, filed on 3rd May 2002.

[14] A. FERREOL, P. CHEVALIER, and L. ALBERA, "Higher order blind separation of non zero-mean cyclostationary sources," in *EUSIPCO* 02, *XI European Signal Processing Conference*, Toulouse, France, Sep. 3–6 2002, pp. 103–106.

[15] L. ALBERA and P. COMON, "Asymptotic performance of contrast-based blind source separation algorithms," in *SAM* 02, *Second IEEE Sensor Array and Multichannel Signal Processing Workshop*, Rosslyn, US, Aug. 4–6 2002.

[16] S. M. SPOONER and W. A. GARDNER, "The cumulant theory of cyclostationary time-series, Part. II: Development and applications," IEEE Transactions on Signal Processing, vol. 42, No. 12, pp. 3409–3429, December 1994.

[17] P. CHEVALIER, "Optimal separation of independent narrow-band sources: Concept and Performances" Signal Processing, Elsevier, vol. 73, pp. 27–47

[18] P. CHEVALIER, G. BENOIT, A. FERREOL, "DF after Blind Identification of the source steering vectors: the Blind-Maxcor and Blind-MUSIC methods", *Proc. EUSIPCO*, Triestre (Italy), pp 2097–2100, September 1996.

What is claimed is:

1. A method of blind identification of sources within a system including P sources and N receivers, comprising the steps of:

identifying the matrix of direction vectors of the sources from the information proper to the direction vectors $a_p$ of the sources contained redundantly in the m=2q order circular statistics of the vector of the observations received by the N receivers, wherein the m=2q order circular statistics are expressed according to a full-rank diagonal matrix of the autocumulants of the sources and a matrix representing the juxtaposition of the direction vectors of the sources as follows:

$$C_{m,x} = A_q \zeta_{m,s} A_q^H$$

where $$\zeta_{m,s} = diag([C_{1,1,\ldots,1,s}^{1,1,\ldots,1}, \ldots, C_{P,P,\ldots,P,s}^{P,P,\ldots,P}])$$

is the full-rank diagonal matrix of the m=2q order autocumulants $$C_{p,p,\ldots,p,s}^{p,p,\ldots,p}$$

des sources, sized (P×P), and where $$A_q = [a_1^{\otimes(q-1)} \otimes a_1^* \ldots a_P^{\otimes(q-1)} \otimes a_P^*],$$

sized ($N^q \times P$) and assumed to be of full rank, represents the juxtaposition of the P column vectors $$[a_p^{\otimes(q-1)} \otimes a_p^*].$$

2. The method according to claim 1, further comprising the following steps:
  a) the building, from the different observation vectors x(t), of an estimate $\hat{C}_{m,x}$ of the matrix of statistics $C_{m,x}$ of the observations,
  b) decomposing a singular value of the matrix $\hat{C}_{m,x}$, and deducing therefrom of an estimate $\hat{P}$ of the number of sources P and a square root $$\hat{C}_{m,x}^{1/2}$$

of $\hat{C}_{m,x}$, in taking $$\hat{C}_{m,x}^{1/2} = E_s |L_s|^{1/2}$$

where |.| designates the absolute value operator, where $L_s$ and $E_s$ are respectively the diagonal matrix of the $\hat{P}$ greatest real eigenvalues (in terms of absolute value) of $\hat{C}_{m,x}$ and the matrix of the associated orthonormal eigenvectors;
  c) extracting, from the matrix $$\hat{C}_{m,x}^{1/2} = [\Gamma_1^T, \ldots, \Gamma_N^T]^T,$$

of the N matrix blocks $\Gamma_n$: each block $\Gamma_n$ sized ($N^{(q-1)} \times P$) being constituted by the $N^{(q-1)}$ successive rows of $$\hat{C}_{m,x}^{1/2}$$

starting from the "$N^{(q-1)}(n-1)+1$"th row;

d) building of the N(N−1) matrices $\Theta_{n1,n2}$ defined, for all $1 \leq n_1 \neq n_2 \leq N$, by $\Theta_{n1,n2} = \Gamma_{n1}^\# \Gamma_{n2}$ where # designates the pseudo-inversion operator;
  e) determining of the matrix $V_{sol}$, resolving the problem of the joint diagonalization of the N(N−1) matrices $\Theta_{n1,n2}$;
  f) for each of the P columns $b_p$ of $\hat{A}_q$, the extraction of the $K=N^{(q-2)}$ vectors $b_p(k)$ stacked beneath one another in the vector $b_p = [b_p(1)^T, b_p(2)^T, \ldots, b_p(K)^T]^T$;
  g) converting said column vectors $b_p(k)$ sized ($N^2 \times 1$) into a matrix $B_p(k)$ sized (N×N);
  h) joint singular value decomposition or joint diagonalization of the $K=N^{(q-2)}$ matrices $B_p(k)$ in retaining therefrom, as an estimate of the column vectors of A, of the eigenvector common to the −K matrices $B_p(k)$ associated with the highest eigenvalue (in terms of modulus);
  i) repetition of the steps f) to h) for each of the P columns of $\hat{A}_q$ for the estimation, without any particular order and plus or minus a phase, of the P direction vectors $a_p$ and therefore the estimation, plus or minus a unitary trivial matrix, of the mixture matrix A.

3. The method according to claim 1, wherein the number of sensors N is greater than or equal to the number of sources P and comprising a step of extraction of the sources, consisting of the application to the observations x(t) of a filter built by means of the estimate $\hat{A}$ of A.

4. The method according to claim 1, wherein $C_{m,x}$ is equal to the matrix of quadricovariance Qx and wherein m=4.

5. The method according to claim 1, wherein $C_{m,x}$ is equal to the matrix of hexacovariance Hx and wherein m=6.

6. The method according to claim 1, comprising a step for the evaluation of the quality of the identification of the associated direction vector in using a criterion such that:

$$D(A, \hat{A}) = (\alpha_1, \alpha_2, \ldots, \alpha_P)$$

where $$\alpha_p = \min_{1 \leq i \leq P} [d(a_p, \hat{a}_i)]$$

and where d(u,v) is the pseudo-distance between the vectors u and v, such that:

$$d(u, v) = 1 - \frac{|u^H v|^2}{(u^H u)(v^H v)}.$$

7. The use of the method according to claim 1, for use in a communications network.

8. A use of the method according to claim 1, for goniometry using identified direction vectors.

9. The method according to claim 1, wherein the number of sensors N is greater than or equal to the number of sources P and wherein the method comprises a step of extraction of the sources, consisting of the application to the observations x(t) of a filter built by means of the estimate $\hat{A}$ of A.

10. The method according to claim 2, wherein the number of sensors N is greater than or equal to the number of sources P and wherein the method comprises a step of extraction of the sources, consisting of the application to the observations x(t) of a filter built by means of the estimate $\hat{A}$ to A.

11. The method according to claim 2, wherein $C_{m,x}$ is equal to the matrix of quadricovariance Qx and wherein m=4.

12. The method according to claim 3, wherein $C_{m,x}$ is equal to the matrix of quadricovariance Qx and wherein m=4.

13. The method according to claim 2, wherein $C_{m,x}$ is equal to the matrix of hexacovariance Hx and wherein m=6.

14. The method according to claim 3, wherein $C_{m,x}$ is equal to the matrix of hexacovariance Hx and wherein m=6.

15. The method according to claim 1, comprising a step for the evaluation of the quality of the identification of the associated direction vector in using a criterion such that:

D(A, Â)=($\alpha_1, \alpha_2, \ldots, \alpha_P$)

where $$\alpha_p = \min_{1 \le i \le P}[d(a_p, \hat{a}_i)]$$

and where d(u,v) is the pseudo-distance between the vectors u and v, such that:

$$d(u, v) = 1 - \frac{|u^H v|^2}{(u^H u)(v^H v)}.$$

16. The method according to claim 2, comprising a step for the evaluation of the quality of the identification of the associated direction vector in using a criterion such that:

D(A, Â)=($\alpha_1, \alpha_2, \ldots, \alpha_P$)

where $$\alpha_p = \min_{1 \le i \le P}[d(a_p, \hat{a}_i)]$$

and where d(u,v) is the pseudo-distance between the vectors u and v, such that:

$$d(u, v) = 1 - \frac{|u^H v|^2}{(u^H u)(v^H v)}.$$

17. The method according to claim 3, comprising a step for the evaluation of the quality of the identification of the associated direction vector in using a criterion such that:

D(A, Â)=($\alpha_1, \alpha_2, \ldots, \alpha_P$)

where $$\alpha_p = \min_{1 \le i \le P}[d(a_p, \hat{a}_i)]$$

and where d(u,v) is the pseudo-distance between the vectors u and v, such that:

$$d(u, v) = 1 - \frac{|u^H v|^2}{(u^H u)(v^H v)}.$$

18. The method according to claim 4, comprising a step for the evaluation of the quality of the identification of the associated direction vector in using a criterion such that:

D(A, Â)=($\alpha_1, \alpha_2, \ldots, \alpha_P$)

where $$\alpha_p = \min_{1 \le i \le P}[d(a_p, \hat{a}_i)]$$

and where d(u,v) is the pseudo-distance between the vectors u and v, such that:

$$d(u, v) = 1 - \frac{|u^H v|^2}{(u^H u)(v^H v)}.$$

19. The method according to claim 5, comprising a step for the evaluation of the quality of the identification of the associated direction vector in using a criterion such that:

D(A, Â)=($\alpha_1, \alpha_2, \ldots, \alpha_P$)

where $$\alpha_p = \min_{1 \le i \le P}[d(a_p, \hat{a}_i)]$$

and where d(u,v) is the pseudo-distance between the vectors u and v, such that:

$$d(u, v) = 1 - \frac{|u^H v|^2}{(u^H u)(v^H v)}.$$

\* \* \* \* \*